April 29, 1941.  A. W. SEYFRIED  2,240,149
CASTER LOCK
Filed March 18, 1940
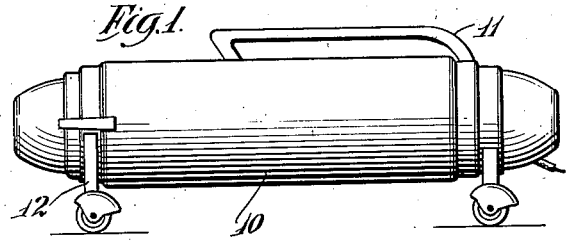
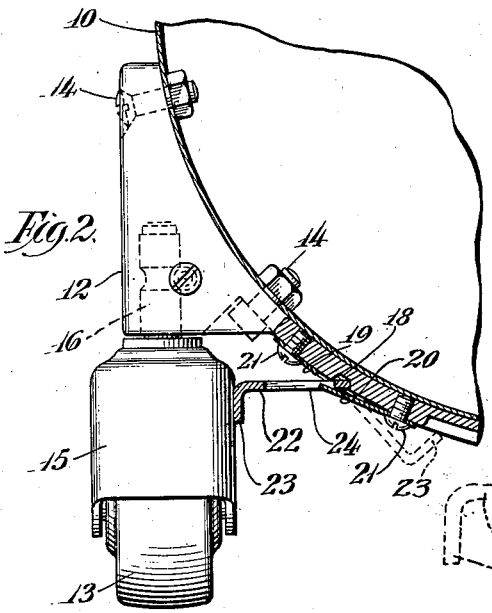
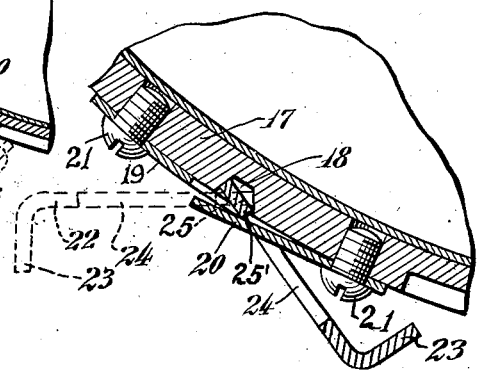
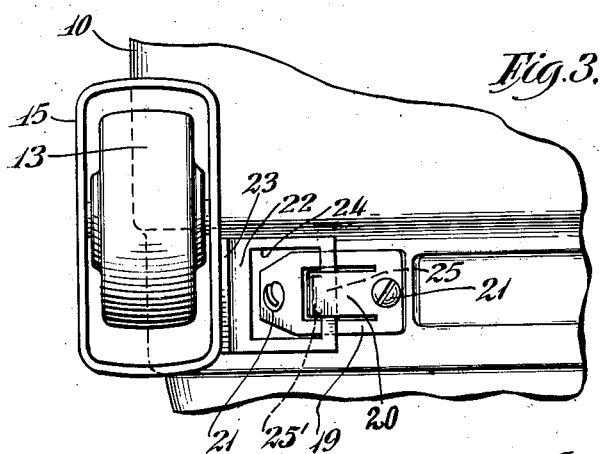
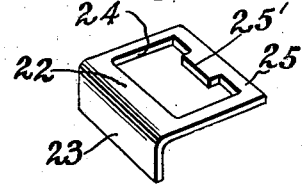
Inventor:
Arthur W. Seyfried
By Bertha L. MacGregor
Attorney.

Patented Apr. 29, 1941

2,240,149

UNITED STATES PATENT OFFICE 2,240,149

CASTER LOCK

Arthur W. Seyfried, Racine, Wis., assignor to Scovill Manufacturing Company, Waterbury, Conn., a corporation of Connecticut Application March 18, 1940, Serial No. 324,632

4 Claims. (Cl. 16—35)

This invention relates to caster locks and particularly to a caster lock adapted for locking a caster on a suction cleaner or other movable object where it is desired to prevent rotation of the caster.

The invention is shown and described as embodied in a tank type suction cleaner. Occasionally such cleaners have to be placed on stairs or in other places where it is necessary to control the direction of movement of the rollers by preventing free rotation of the casters. The object of my invention is to provide a caster lock efficient for its intended purpose, simple in construction and easy to operate. The locking device is arranged to be moved into locking position by a single movement of the user's finger and to remain in locking position until released by another single movement by the user.

In the drawing:

Fig. 1 is an elevational view of a suction cleaner to which my caster lock has been applied.

Fig. 2 is a view showing part of the cleaner in transverse section, the caster and attaching means in elevation and my caster lock in transverse section.

Fig. 3 is a bottom plan view of the parts shown in Fig. 2.

Fig. 4 is an enlarged view of part of Fig. 2, showing the lock in released position.

Fig. 5 is a perspective view of the locking plate, detached.

In that embodiment of my invention shown in the drawing, the caster lock is applied to a suction cleaner comprising a cylindrical body 10, handle 11, caster attaching brackets 12 and casters 13. Screws 14 secure the attaching brackets 12 to the housing 10. The caster housings 15 are conventional caster flat sided housings mounted on the spindle 16 rotatable in the bracket 12.

For mounting the caster lock, I provide a plate 17 shaped to fit the curved wall of the housing 10 below the bracket 12 and connected to or integral with the housing 10. The plate 17 is notched or recessed at 18 on its outer surface. The lock proper comprises a spring metal plate 19, cut to form a tongue 20, which overlies the plate 17 and is secured thereto by screws 21. The locking member is a flat plate 22 having at one end a right angle flange 23 for bearing on the caster housing 15, the plate 22 being cut away to provide an opening 24. The part 25 of the plate 22 has a tongue 25' projecting into the opening 24. The part 25 is inserted in the notch 18, under the plate 19.

When the plate 22 of the locking member is in horizontal position as shown in Fig. 2, the flange 23 bears against the flat side of the caster housing, prevents rotation of the caster and holds the caster in such position that the roller can travel only in a direction parallel with the axis of the cleaner. To unlock the caster, the plate 22 is moved manually to the position shown in Fig. 4 and in dotted lines in Fig. 2. The spring tongue 20 bears on the rigid tongue 25' of the locking plate 22 and retains the locking plate 22 in either of the positions shown and also in a position midway between them, if desired.

Changes may be made in details of construction without departing from the scope of my invention.

I claim:

1. A caster lock comprising, in combination with a caster and a support, a resilient retaining member secured at one end to the support and free at its opposite end, and a locking plate having an opening through it, said locking plate being yieldingly engaged by said retaining member between said opening and one end of the plate and adapted to bear on said caster at the opposite end.

2. A caster lock comprising, in combination with a caster and a support, a retaining member secured to the support and cut to form a spring metal tongue, and a locking plate having an opening through it, said locking plate being yieldingly engaged by said spring metal tongue between said opening and one end of the plate and adapted to bear on said caster at the opposite end.

3. A caster lock comprising, in combination with a caster and a support having a notched surface, a retaining member secured to the support and having a yielding portion resiliently overlying the notched surface, and a locking plate having an opening therein and being yieldingly engaged between said opening and one end by said yielding portion of the retaining member, said locking plate being movable between said notched surface and said retaining member to move its free end into and out of caster engaging position.

4. A caster lock comprising, in combination with a caster and a support having a notched surface, a retaining member having a median yielding portion, the retaining member being secured to the support, and a locking plate having an opening through it and a rigid tongue on one end projecting into the opening, said end being located between the support and the retaining member, and said rigid tongue being engaged by the yielding portion of the retaining member to retain the locking plate in locked and unlocked positions.

ARTHUR W. SEYFRIED.